US006179096B1

(12) United States Patent
Kinerson et al.

(10) Patent No.: US 6,179,096 B1
(45) Date of Patent: Jan. 30, 2001

(54) EXHAUST BRAKE VARIABLE BYPASS CIRCUIT

(75) Inventors: Kevin Kinerson, Vernon; Greg Davies, Suffield; Norman Schaefer, Pleasant Valley; Sotir Dodi, Windsor, all of CT (US)

(73) Assignee: Diesel Engine Retarders, Inc., Christiana, DE (US)

( * ) Notice: Under 35 U.S.C. 154(b), the term of this patent shall be extended for 0 days.

(21) Appl. No.: 08/968,687

(22) Filed: Nov. 12, 1997

(51) Int. Cl.[7] ..................................................... B60T 11/10
(52) U.S. Cl. ............................ 188/154; 60/324; 123/323
(58) Field of Search .................................... 188/154, 272, 188/273; 60/324; 123/323, 320

(56) References Cited

U.S. PATENT DOCUMENTS 2,895,571 7/1959 Hanebeck .
3,096,614 7/1963 Silver et al. .
3,234,924 2/1966 May .
3,523,418 8/1970 Marsee .
3,591,959 7/1971 Kubis .
3,838,670 10/1974 King .
3,941,035 3/1976 Mueller .
4,005,578 2/1977 McInerney .
4,005,579 2/1977 Lloyd .
4,062,332 12/1977 Perr .
4,075,990 2/1978 Ribeton .
4,111,166 * 9/1978 Alstrin et al. ...................... 123/97 B
4,220,008 9/1980 Wilber et al. .
4,335,849 6/1982 van Bashuysen .
4,387,572 6/1983 Richardson et al. .
4,389,984 6/1983 Destrampe .
4,553,648 11/1985 Suzuki et al. .
4,557,233 12/1985 Joppig et al. .
4,665,692 5/1987 Inaba .
4,669,435 6/1987 Furusawa et al. .
4,682,674 7/1987 Schmidt .
4,707,987 11/1987 Atkin .
4,750,459 6/1988 Schmidt .
4,787,044 11/1988 Nagata et al. .
4,835,963 6/1989 Hardy .
4,905,200 2/1990 Pidsosny et al. .
4,945,870 8/1990 Richeson .
4,987,869 1/1991 Hilburger .
5,050,376 9/1991 Stiglic et al. .
5,079,921 1/1992 McCandless et al. .
5,372,109 12/1994 Thompson et al. .
5,394,901 * 3/1995 Thompson et al. ............... 137/513.3
5,435,347 7/1995 Gillingham .
5,638,926 6/1997 McCrickard .

FOREIGN PATENT DOCUMENTS 8524512 10/1985 (GB) .
58-33506 2/1983 (JP) .

OTHER PUBLICATIONS

Hakansson, N., Kemlin, J. and Nilsson, R., "Cold Starting the Volvo Way", SAE/P–89–220, 1989.
Buntling, A., "Eager for EGR", Transport Engineer, Jul. 1997.

* cited by examiner

*Primary Examiner*—Christopher P. Schwartz
*Assistant Examiner*—Pamela J. Rodriguez
(74) *Attorney, Agent, or Firm*—David R. Yohannan; Collier Shannon Scott, PLLC

(57) ABSTRACT

An exhaust brake for an internal combustion engine is disclosed. The exhaust brake includes a main valve and a bypass valve for restricting the flow of exhaust gas. The main valve may be selectively closed, while the bypass valve is biased into a closed position with a selective biasing force. Closing the main valve may cause exhaust back pressure to build against the bypass valve until the biasing force is overcome. When the biasing force is surpassed by the exhaust back pressure, the bypass valve opens to relieve the back pressure. The bypass valve closes when back pressure falls below the biasing force. The biasing force may be varied to operate the exhaust brake at a maximum back pressure for a given engine speed and/or engine condition. A method of operating the exhaust brake is also disclosed.

23 Claims, 5 Drawing Sheets

EXHAUST BRAKE VARIABLE BYPASS CIRCUIT

FIELD OF THE INVENTION

The present invention relates to exhaust brakes and their use independently or in conjunction with engine brakes. More specifically the invention relates to control of the flow of exhaust gas through an exhaust brake.

BACKGROUND OF THE INVENTION

Presently, it is not uncommon for vehicles, such as trucks and buses, to be equipped with an exhaust brake. Fundamentally, an exhaust brake need only comprise some means for restricting the flow of exhaust gas from an internal combustion engine. Restricting the exhaust gas increases the exhaust manifold pressure, i.e. "back pressure". The exhaust manifold pressure may be used to oppose the motion of the engine pistons, converting the kinetic energy of the pistons into thermal energy. The engine and vehicle may be slowed by dissipating the thermal energy that is generated. Selective restriction of the flow of exhaust gas from the engine may therefore be used to selectively brake or not brake a vehicle.

An exhaust brake may be used to complement and/or enhance the braking achieved with compression release braking systems, and more specifically compression release systems that use exhaust gas recirculation (EGR). EGR may be used to increase the braking power of a compression release braking system. EGR returns exhaust gas to a cylinder from the exhaust manifold to boost the mass of gas in the cylinder for each compression release event. In order to carry out EGR in a compression release braking system, high exhaust gas back pressure (i.e. exhaust manifold pressure) is required to charge the cylinders with exhaust gas during the intake cycle. The increase in compression release braking realized from EGR is therefore related to the amount of exhaust gas that is returned to the cylinder, which in turn is related to the exhaust manifold pressure. Thus, the increased exhaust manifold pressure produced by an exhaust brake may be particularly useful for use in compression release braking systems that employ EGR.

Exhaust manifold pressure produced by an exhaust brake may also be useful in warming an engine during positive power operation. A cold engine may be more quickly warmed by placing the engine under load during positive power operation. Partially closing an exhaust brake during positive power creates an engine load because it makes it more difficult for the pistons to cycle in the cylinders. The exhaust brake creates this load by backing up warm exhaust gases in the engine and exhaust manifold, which also helps to warm the engine at an accelerated pace.

An exhaust brake may generate exhaust back pressure in the exhaust manifold. The back pressure in the exhaust manifold may be proportional to the speed of the engine. The faster the engine runs, the more frequently exhaust gas is discharged to the exhaust manifold, and consequently the higher the exhaust manifold pressure. The increased manifold pressure produced by an exhaust brake translates into decreased removal of heat from the engine. Engines cannot withstand unlimited amounts of exhaust manifold pressure or the accompanying heat. Accordingly, exhaust brakes have been designed so that the thermal limits of an engine are not exceeded when the engine is running at maximum speed. This type of exhaust brake design optimizes engine and exhaust braking only for one engine condition; maximum speed. Very frequently, however, engine braking and exhaust braking is carried out at less than maximum engine speed. As engine speed decreases, so does exhaust manifold pressure, and as a result the level of braking realized is decreased.

Some exhaust brakes have been designed to provide a fixed maximum level of back pressure over a range of engine speeds. In such exhaust brakes, control of the exhaust manifold pressure may be achieved by control of the restriction of exhaust gas flow by the exhaust brake. These exhaust brakes typically allow back pressure to build to a preset limit. Back pressure which exceeds the preset limit is relieved via a bypass around the closed exhaust brake. For example, U.S. Pat. No. 5,638,926 to McCrickard discloses an exhaust brake having a main tube and a bypass tube. During exhaust braking, the main tube is blocked with a rotatable valve. Back pressure is relieved by opening a bypass valve located at the far end of the bypass tube. Also see U.S. Pat. Nos. 4,750,459 and 4,682,674 to Schmidt, and U.S. Pat. No. 5,372,109 which disclose alternative bypass arrangements for an exhaust brake.

One restriction of other exhaust brakes is that they may be limited to providing one level of exhaust braking. For example, an exhaust brake, such as the one disclosed in the above-referenced patent to McCrickard, does not provide a means for varying the pressure level which results in opening the bypass valve. The bypass valve must be set to open at a back pressure which will not cause the engine temperature to exceed a critical level when the engine is running at maximum speed. As it turns out, however, this preset back pressure is less than the maximum back pressure which could be used at lower engine speeds. This preset is therefore only optimal for maximum engine speed. Accordingly, there is a need for exhaust brakes which provide variable levels of exhaust back pressure.

The present invention improves exhaust brake performance by selective variation of the back pressure at which a bypass valve opens. Variation of this pressure in response to one or more engine conditions can optimize the back pressure for a range of engine speeds. One way of determining the optimal back pressure for a given engine speed is to sense the temperature of the engine. The critical temperature of the engine may be tracked for a range of engine speeds by varying the bypass pressure so that engine temperature is a constant safe margin below critical temperature for each engine speed. Tracking the critical temperature in this way may result in selection of a moderate back pressure at the maximum engine speed, and a gradually increasing back pressure down through the speed range to the lowest engine speed. Variable back pressure through bypass control may enable tailoring the exhaust braking effect to optimize braking in response to the variation of conditions such as engine speed, exhaust pressure, engine temperature, EGR activation, and/or compression release braking activation. Control of the bypass pressure may be particularly beneficial in combination braking systems which may require high back pressure at low engine speeds and low back pressure at high engine speeds.

Bypass systems should also be constructed to remain operable under the harsh conditions of an exhaust brake. Exhaust gas typically contains carbon particles, water moisture, and other contaminants within it. Exposure of the moving parts of a bypass system to exhaust gas and its contaminants can cause the moving parts to rust and become gummed up with carbon. Bypass valves, such as the one disclosed in the above-referenced Schmidt patents, have been known to become inoperable because of the build up of contaminants on the moving parts in the system. Accordingly, there is also a need for an exhaust brake bypass system that is less prone to malfunction as a result of carbon, rust, or other contaminant build up on the moving parts of the bypass.

Furthermore, bypass systems should preferably be designed to avoid the exposure of heat sensitive elements of the bypass from being over exposed to high temperature exhaust gas. A bypass system may use a spring and/or electronic activators to open and close the bypass. These types of elements may not operate well under fluctuating or extreme temperature conditions. Accordingly, there is a need for an exhaust brake with a bypass activator that has an acceptable exposure to high temperature exhaust gas.

One of the designs described herein is a bolt-on bypass circuit which may be very effective at reducing the exposure of the bypass spring and/or electronic activators to exhaust gas temperatures. A bolt-on bypass may also add the benefit of manufacturability which allows for a fixed flow area device or a variable area device with minimal manufacturing set up changes. A bolt-on bypass may be used with an exhaust brake that is pre-configured to accept the bypass. The exhaust brake may be provided originally with two or more plugged openings. The openings may be unplugged when a bolt-on bypass is added to provide exhaust gas flow to and from the bypass.

OBJECTS OF THE INVENTION

It is therefore an object of the present invention to provide an exhaust brake with a bypass around a main valve in the exhaust brake.

It is another object of the present invention to provide an exhaust brake which provides variable levels of exhaust back pressure.

It is a further object of the present invention to provide selective activation of a bypass valve in an exhaust brake.

It is still another object of the present invention to shield a means for operating a bypass valve in an exhaust brake from exhaust gas born contaminants.

It is yet another object of the present invention to provide selective activation of a bypass valve in an exhaust brake responsive to an engine condition.

It is still yet another object of the present invention to provide an exhaust brake that is useful as a warm up device for an engine.

It is yet a further object of the present invention to provide an exhaust brake that makes use of bolt-on bypass system.

It is still a further object of the present invention to provide a method of operating an exhaust brake that is responsive to the thermal loading of an engine.

Additional objects and advantages of the invention are set forth, in part, in the description which follows and, in part, will be apparent to one of ordinary skill in the art from the description and/or from the practice of the invention.

SUMMARY OF THE INVENTION

In response to the foregoing challenge, Applicants have developed an innovative, economical exhaust brake comprising: a main exhaust passage; means for selectively blocking the flow of exhaust gas through the main exhaust passage; a bypass exhaust passage communicating with said main exhaust passage and providing for the flow of exhaust gas around the means for selectively blocking; means for selectively closing the bypass exhaust passage; means for biasing the means for selectively closing in a closed position; and means for varying a biasing force applied by the means for biasing to the means for selectively closing.

Applicants have also developed an innovative and economical exhaust brake comprising a housing containing a main valve, a bypass passage provided through the main valve, a bypass valve for closing the bypass passage, and the improvement comprising means for selectively opening the bypass valve responsive to an engine condition value.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention, and together with the detailed description serve to explain the principles of the present invention.

DETAILED DESCRIPTION OF THE PREFERRED EMBODIMENTS

Figure 1:
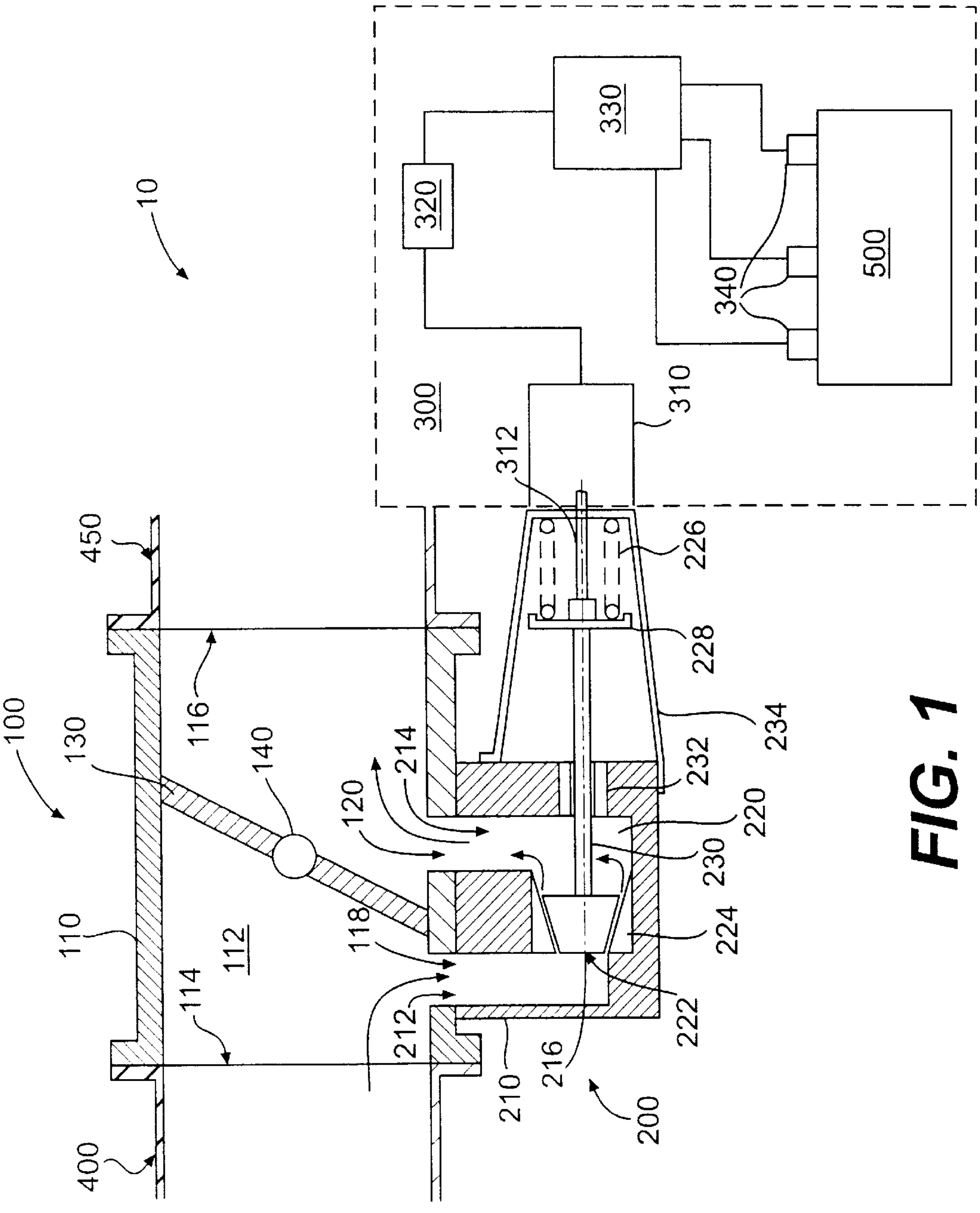
FIG. 1 is a cross-sectional view in elevation of an exhaust brake embodiment of the invention.

Reference will now be made in detail to a preferred embodiment of the present invention, an example of which is illustrated in the accompanying drawings. A preferred embodiment of the present invention is shown in FIG. 1 as exhaust brake 10.

In a preferred embodiment, the exhaust brake 10 comprises a main valve 100, a bypass valve 200, and control system 300. The main valve housing 110 may have a passage 112 extending therethrough, and an inlet 114 and an outlet 116. The inlet 114 may be connected to an upstream exhaust conduit 400 leading from an engine exhaust manifold (not shown). The outlet 116 may be connected to the remainder of a vehicle exhaust system 450, which may include a muffler and exhaust pipe (not shown).

The main valve 100 also includes a gate 130 which may be used to selectively block and unblock the passage 112. The gate 130 may have an axle 140 running through a central region of the gate. The axle 140 may extend from the gate 130 through the main valve housing 110 to an actuator (not shown) outside of the housing. The actuator may comprise a solenoid, air, vacuum, hydraulic, electronic, or other type of actuation device. The actuator may be linked to the gate 130 so that it can rotate the gate in the passage 112 between blocking and unblocking positions.

The gate 130 is shown to be a butterfly valve in FIG. 1. In alternative embodiments, however, the gate 130 may be provided by a sliding gate, flapper, iris type, rotary, or any other means for selectively blocking the flow of exhaust gas through the passage 112.

The main valve 100 may have two ports 118 and 120 in the housing 110 at upstream and downstream locations relative to the gate 130. The ports 118 and 120 provide communication between an inlet 212 and an outlet 214 of the bypass valve housing 210.

A bypass restrictor 220 is provided in the exhaust gas passage 216 extending through the housing 210. The bypass restrictor may include a conical shaped stopper 222 and a mating conical shaped valve seat 224 for the stopper. The stopper 222 may be biased in a closed position against the valve seat 224 by a spring 226. The spring 226 is compressed, and as a result transmits a biasing force to the stopper 222 through plate 228 and rod 230. A seal 232 may be provided around the rod 230 to prevent exposure of the spring 226 to exhaust gas and to provide thermal insulation of the spring. The spring 226, the plate 228, and the portion of the rod 230 which extends past the seal 232 may be enclosed in a separate housing or bracket 234.

The spring 226 provides a means for biasing the stopper 222 in a closed position. The biasing force applied by the spring 226 to the stopper may be varied using control system 300. The control system 300 may include an actuator 310 attached to the back of the bracket 234. The actuator 310 may be a vacuum, air, hydraulic, or an electronic actuator. The actuator 310 may have a shaft 312 connected to the plate 228. The actuator 310 may be controlled by controller 320 which may receive control instructions from a computer 330 used to determine the appropriate biasing force for the stopper 222. The computer 330 may determine the appropriate biasing force based upon information received from sensors 340. Sensors 340 may be used to sense conditions of the engine/vehicle 500, such as engine speed, exhaust gas pressure, engine temperature, exhaust gas temperature, exhaust gas recirculation activation, exhaust brake activation, foundation brake application, compression release braking activation, vehicle speed, cylinder pressure, intake manifold pressure, fuel rate, throttle position, percent of engine load, ambient temperature, air fuel ratio, vehicle start up, and head rejection to coolant Btu/min.

When the exhaust brake 10 is activated, the gate 130 may be rotated into a blocking position, as shown in FIG. 1. Exhaust gas flows into the main valve 100 through inlet 114 and is blocked by the gate 130. The blocked exhaust gas is diverted to the bypass valve 200 and flows through port 118, bypass inlet 212, and bypass exhaust gas passage 216. As exhaust gas is diverted to the bypass valve 200, pressure builds against the stopper 222, which is biased closed by the spring 226 against the valve seat 224. Eventually the exhaust back pressure on the stopper 222 may build to a level sufficient to overcome the force of spring 226. The force from spring 226 is transmitted by rod 230 which may have a length sufficient to remove the spring from excessive thermal loading. At this point the stopper 222 is pushed in, away from the valve seat 224, such that the exhaust gas flows past the stopper to the downstream side of the main valve 100. As exhaust gas flows to the downstream side of the main valve 100, the exhaust back pressure asserted against the stopper 222 falls until the spring 226 can close the stopper.

The biasing force applied by the spring 226 to the stopper 222 may be varied to control the exhaust back pressure level at which the stopper will be opened. The biasing force may equal the maximum exhaust back pressure the engine valve train can accommodate. The biasing force may change by using the actuator 310 to provide a pushing or pulling biasing force on the plate 228 through shaft 312. If wanted, the actuator 310 may be used to completely overcome the force of the spring 226 and open the stopper 222 on command. In this manner, the actuator 310 can be used to increase the exhaust back pressure level required to open stopper 222 with decreasing engine speed. Using sensors 340, actuator 310 can be used to set the exhaust back pressure level that will open the stopper 222 at the maximum level it can be without exceeding the temperature and/or exhaust manifold pressure constraints of the engine 500.

Figure 2:
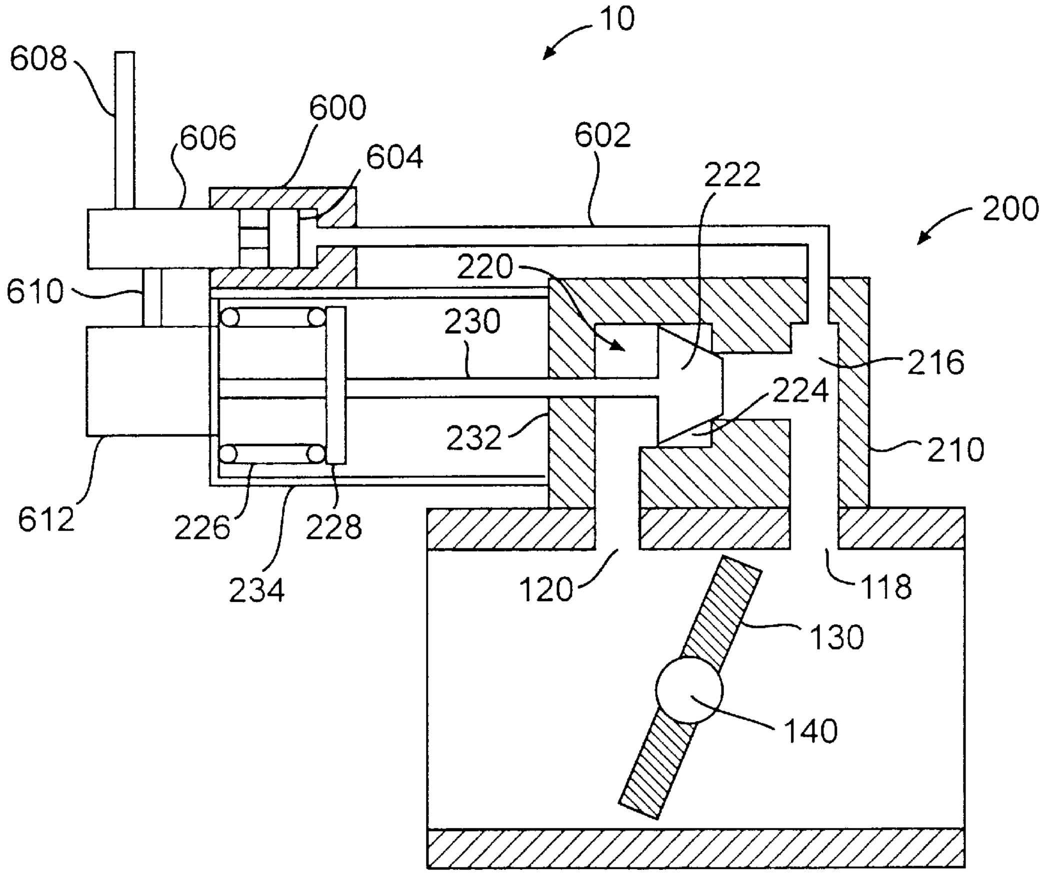
FIG. 2 is a cross-sectional view in elevation of a second exhaust brake embodiment of the invention.

With regard to FIG. 2, in which like elements are identified with like reference numerals, in an alternative embodiment of the invention the biasing force on the plate 228 is controlled mechanically. This may be done by connecting passage 216 in the bypass valve housing 210 to the variable control housing 600 with passage 602. The variable control housing can be attached to the bracket 234 or remotely mounted. Within the control housing 600 may be a plunger 604 that is used to control a variable pressure device 606. The variable pressure device 606 regulates the supply pressure 608 to the pneumatic actuator 612 through connector 610. The pressure supplied from supply 608 to the pneumatic actuator 612 may be proportional to the displacement of plunger 604 within control housing 600.

By increasing or decreasing the pressure to the pneumatic actuator 612, the biasing force may be increased or decreased to open the bypass valve 200. As the exhaust back pressure increases, the plunger 604 may be pushed in and the pneumatic pressure to the actuator 612 increased. The increased pneumatic pressure acts to pull the bypass valve 200 open against the closing force of the spring 226. If the pneumatic pressure becomes great enough, the opening force of the actuator 612 may overcome the closing force of the spring 226 and the bypass valve will open. Opening the bypass valve 200 may reduce the pressure on the plunger 604 which in turn may reduce the opening force of the actuator 612. When the opening force is sufficiently reduced, the bypass valve 200 may close under the force of the spring 226.

In alternative embodiments, the actuator 612 may be responsive to electrical, hydraulic, a or mechanical actuation as opposed to pneumatic actuation. For example, the actuator 612 may comprise a solenoid that opens the bypass valve 200 in response to a predetermined displacement of the plunger 604. As an alternative to the linear displacement provided by a solenoid, the actuator 612 may comprise a ball screw that provides opening through an angular displacement. It is also appreciated that the predetermined displacement of the plunger that results in the bypass valve being opened may be varied as called for by operation of the engine and/or vehicle.

Figure 3:
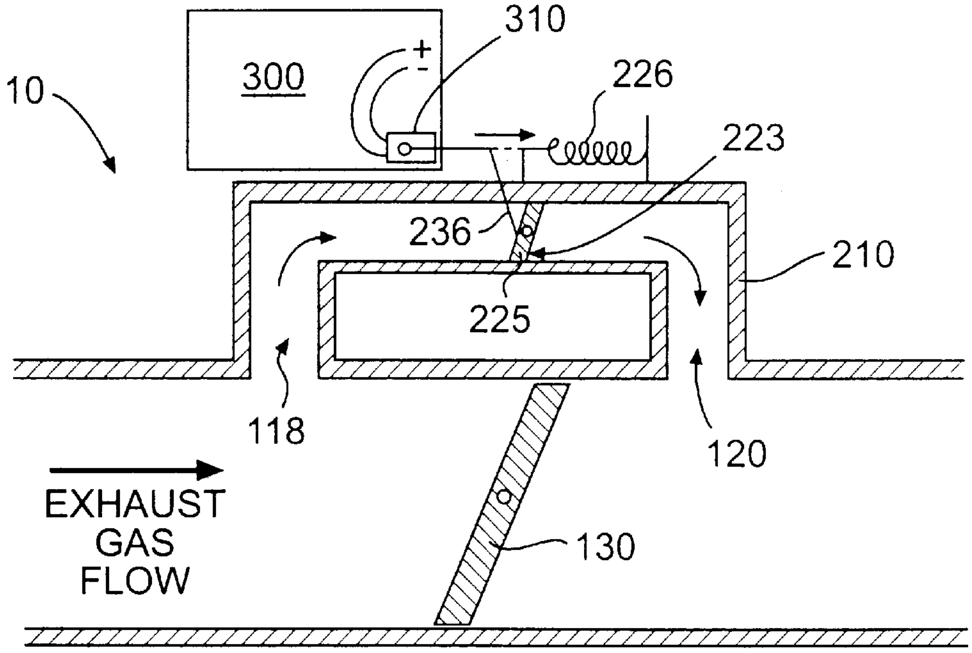
FIG. 3 is a cross-sectional view in elevation of a third exhaust brake embodiment of the invention.

With regard to FIG. 3, in which like elements are identified with like reference numerals, an alternative bypass restrictor 220 is shown. The exhaust brake functions the same as the exhaust brake shown in FIG. 1. The differences between the two exhaust brakes (that in FIG. 1 and that in FIG. 3) arise from the use of a different type of bypass valve. In FIG. 3, the bypass restrictor 220 is provided using a butterfly valve 223 rather than a conical stopper (shown in FIG. 1). The butterfly valve 223 may be rotatable on an axle 225 which extends through the butterfly valve and out of the housing 210. The axle 225 may be connected to a means for biasing 226 the butterfly valve via a lever arm 236. Control over the force biasing the butterfly valve 223 is realized using control system 300 which may include actuator 310.

Figure 4:
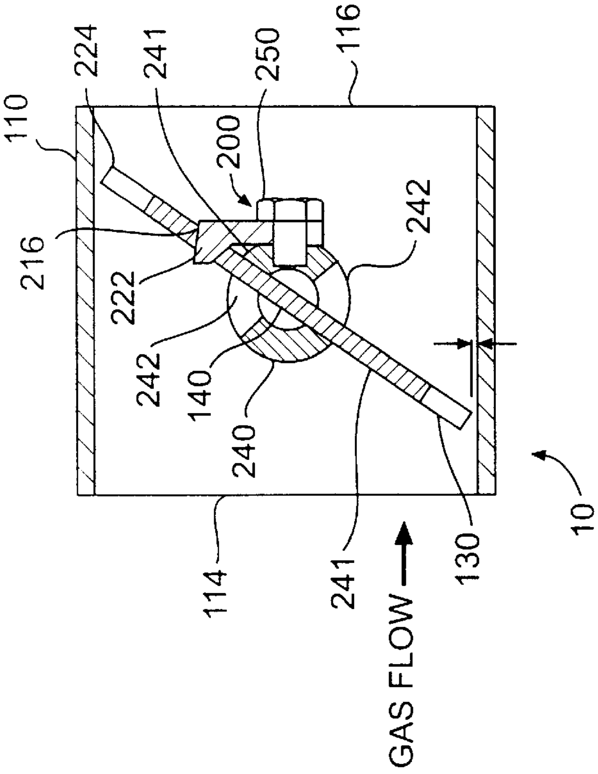
FIG. 4 is a view of section B—B of the exhaust brake shown in FIG. 5.

With regard to FIG. 4, in which like elements are identified with like reference numerals, an alternative embodiment of the invention is shown. In this embodiment, the bypass valve 200 is provided within the main valve 100 using a selectively opened passage 216 through the gate 130 in the main valve. The bypass valve comprises a stopper 222 which fits into passage 216 and seats against a valve seat 224 provided along the wall of passage 216. The stopper 222 may have a conical shape so that it is less likely to jam against the mating valve seat 224. The stopper 222 may be attached by a screw, weld, or other attachment means 250 to a flange 241 which extends from a ring 240.

The ring 240 is coaxial with the axle 140 on which the gate 130 is rotated. During operation of the bypass valve 200, the stopper 222 may be pushed out of contact with the valve seat 224 causing the flanges 241 to rotate relative to the axle 140 and the gate 130. Contact between the flanges 241 and the gate 130 when the bypass valve is closed, cause the ring 240 to rotate with the gate 130 and the axle 140 when the main valve is opened.

Figure 5:
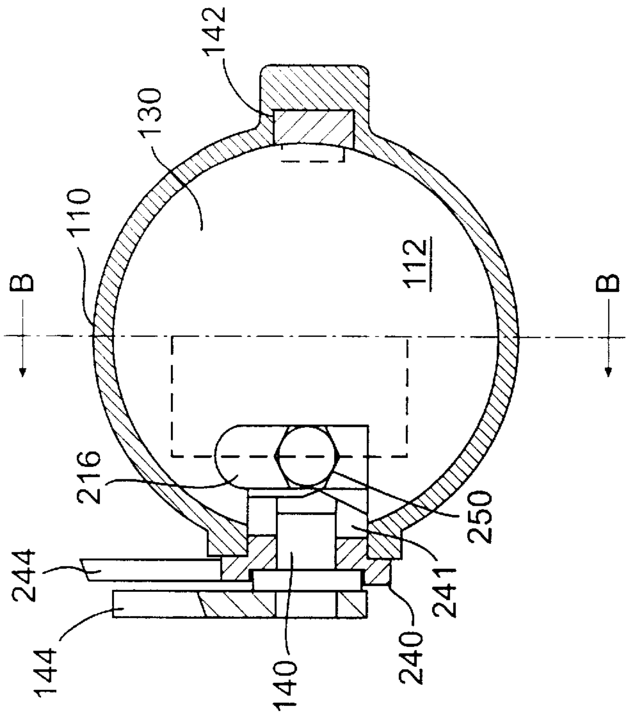
FIG. 5 is a view of section A—A of the exhaust brake shown in FIG. 6.

With reference to FIG. 5, the gate 130 is viewed from a downstream location. FIG. 5 is related to FIG. 4 in that it is the source of section B—B shown in FIG. 4. The ring 240 does not extend into the main valve passage 112, however the flanges 241 do extend into this passage. The ring 240 extends out of the housing 110 and is connected to a bypass valve arm 244. The axle 140 passes through a bore provided in the ring 240. The axle 140 may be received at a boss 142 at a distal end, and connected to a main valve arm 144 at a proximal end.

Figure 6:
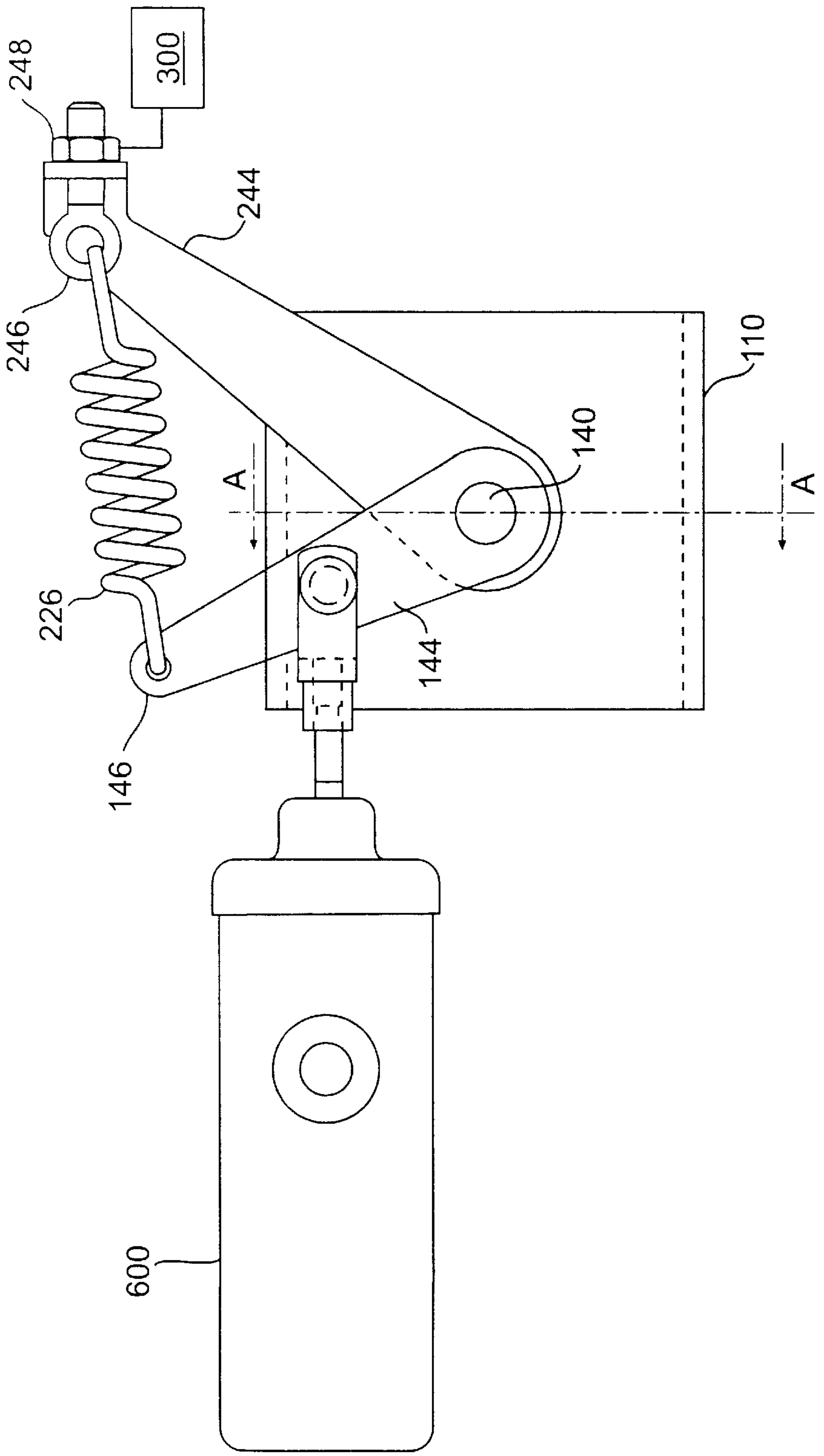
FIG. 6 is a side view in elevation of a fourth exhaust brake embodiment of the invention.

With reference to FIG. 6, the main valve arm 144 and the bypass valve arm 244 are shown. The main valve arm 144 may be connected near its midpoint to a main valve actuator 600. Linear motion provided by the actuator 600 is converted by means of the main valve arm into a rotational movement for application to the axle 140. The gate 130 in the main valve may be opened by extending the actuator 600 to rotate the axle 140 in a clockwise direction. Rotation of the axle 140 and gate 130 causes the ring 240 and bypass valve arm 244 to rotate in a clockwise direction due to contact between the gate 130 and the flanges 241. The angular separation of the main valve arm 144 and the bypass valve arm 244 is, thus, not affected by the opening and closing of the gate 130 in the main valve.

With reference to FIGS. 4–6, the stopper 222 may be biased in a closed position against the valve seat 224 by a tension spring 226 linking the end 146 of the main valve arm with the end 246 of the bypass valve arm. The spring 226 is under tension, and as a result transmits a force through bypass valve arm 244, ring 240, and flange 241 that biases the stopper 222 into a closed position against the valve seat 224.

The biasing force applied by the spring 226 to the stopper may be varied using adjustment nut 248. A control system 300 may be provided to adjust the nut 248 during exhaust braking or to activate the lever 244. The control system 300 may include the features discussed in relation to the embodiment shown in FIG. 1.

With continued reference to FIGS. 4—6, when the gate 130 is closed (as shown in FIG. 4) exhaust gas flows into the main valve 100 through inlet 114 and is blocked by the gate 130. As pressure builds against the stopper 222, which is biased closed by the spring 226 against the valve seat 224. Eventually the exhaust back pressure on the stopper 222 may build to a level sufficient to overcome the force of spring 226. At this point the stopper 222 is pushed in, away from the valve seat 224, such that the exhaust gas flows past the stopper to the downstream side of the main valve 100. As exhaust gas flows to the downstream side of the main valve 100, the exhaust back pressure asserted against the stopper 222 falls until the spring 226 can close the stopper.

It will be apparent to those skilled in the art that various modifications and variations can be made in the construction, configuration, and/or operation of the present invention without departing from the scope or spirit of the invention. For example, in the embodiments mentioned above, means other than a spring, such as hydraulic, electronic, air, vacuum, etc., may be used to bias the bypass valve stopper into a closed position, without departing from the scope of the invention. Further, various changes may be made to the shape of the main valve and bypass valve housing(s), and the type of gate used to block the main valve, without departing from the scope of the invention. The invention also should not be limited to application in aftermarket exhaust brakes. Thus, it is intended that the present invention cover the modifications and variations of the invention provided they come within the scope of the appended claims and their equivalents.

We claim:

1. An exhaust brake comprising:

a main exhaust passage;

means for selectively blocking the flow of exhaust gas through the main exhaust passage;

a bypass exhaust passage communicating with said main exhaust passage and providing for the flow of exhaust gas around the means for selectively blocking;

means for selectively closing the bypass exhaust passage, said selectively closing means comprising a conical shaped stopper;

means for biasing the means for selectively closing in a closed position;

means for varying a biasing force applied by the means for biasing to the means for selectively closing; and means for applying an opening force to said means for selectively closing, wherein said means for applying an opening force is adapted to mechanically pull said means for selectively closing into an open position.

2. The exhaust brake of claim 1 wherein said means for applying an opening force comprises pneumatic means.

3. The exhaust brake of claim 2 wherein said pneumatic means comprises:

a plunger communicating with said bypass exhaust passage; and a means for providing variable pneumatic pressure that is responsive to a displacement of said plunger, wherein the opening force is proportional to the variable pneumatic pressure of the pneumatic pressure means.

4. The exhaust brake of claim 1 wherein said bypass exhaust passage is provided through the means for selectively blocking.

5. The exhaust brake of claim 1 wherein said means for applying an opening force comprises an electrical actuator selected from the group consisting of a solenoid and a ball screw.

6. The exhaust brake of claim 1 wherein said means for applying an opening force is thermally isolated from said exhaust gas.

7. The exhaust brake of claim 1 wherein said means for applying an opening force is responsive to an engine condition value.

8. The exhaust brake of claim 7 wherein said engine condition is selected from the group consisting of: engine speed, exhaust gas pressure, engine temperature, exhaust gas recirculation activation, compression release braking activation, exhaust manifold temperature, exhaust manifold pressure, exhaust gas temperature, foundation brake application, cylinder pressure, vehicle speed, exhaust brake actuation, intake manifold pressure, fuel rate, throttle position, percent of engine load, ambient temperature, air fuel ratio, vehicle start up, and head rejection to coolant Btu/min.

9. The exhaust brake of claim 1 wherein said means for varying the biasing force is responsive to an engine condition value.

10. The exhaust brake of claim 9 wherein said engine condition is selected from the group consisting of: engine speed, exhaust gas pressure, engine temperature, exhaust gas recirculation activation, compression release braking activation, exhaust manifold temperature, exhaust manifold pressure, exhaust gas temperature, foundation brake application, cylinder pressure, vehicle speed, exhaust brake actuation, intake manifold pressure, fuel rate, throttle position, percent of engine load, ambient temperature, air fuel ratio, vehicle start up, and heat rejection to coolant Btu/min.

11. An exhaust brake comprising:

a main exhaust passage;

a main butterfly valve in said main exhaust passage for selectively blocking the flow of exhaust gas through the main exhaust passage;

means for selectively opening and closing the main butterfly valve;

a bypass exhaust passage communicating with said main exhaust passage at upstream and downstream locations relative to the main butterfly valve, said bypass providing for the flow of exhaust gas past the main butterfly valve;

a bypass valve in said bypass exhaust passage for selectively closing the bypass exhaust passage;

a spring assisted means for biasing the bypass valve in a closed position; and means for varying a biasing force provided by the biasing means responsive to an engine condition selected from the group consisting of: engine speed, exhaust gas pressure, engine temperature, exhaust gas recirculation activation, compression release braking activation, intake manifold pressure, fuel rate, throttle position, percent of engine load, ambient temperature, air fuel ratio, vehicle start up, and head rejection to coolant Btu/min;

wherein the bypass valve comprises a conical shaped stopper.

12. The exhaust brake of claim 11 wherein the bypass exhaust passage is provided through the main butterfly valve.

13. The exhaust brake of claim 11 wherein the bypass valve further comprises:

a rod linking the stopper and the spring assisted biasing means; and a bushing providing a seal along the rod between the stopper and the spring assisted biasing means.

14. The exhaust brake of claim 13 wherein said means for varying a biasing force comprises:

a plunger communicating with said bypass exhaust passage; and a means for providing variable pneumatic pressure in response to a displacement of said plunger, wherein the biasing force is varied in proportion to the variable pneumatic pressure of the pneumatic pressure means.

15. The exhaust brake of claim 11 wherein said bypass exhaust passage and bypass valve are part of a bolt-on bypass system, and wherein said upstream and downstream locations comprise unplugged ports in said main exhaust passage.

16. An exhaust brake comprising:

a main exhaust passage;

a main butterfly valve in said main exhaust passage;

a bypass exhaust passage through the main butterfly valve;

a bypass valve for opening and closing the bypass exhaust passage;

an actuator connected to the main butterfly valve through a first lever arm;

a second lever arm linked to the bypass valve at an axle end; and a tension spring connecting the first and second lever arms such that the bypass valve linked to the second lever arm is biased in a closed position.

17. The exhaust brake of claim 16 further comprising means for changing the tension in said spring.

18. The exhaust brake of claim 17 wherein said means for changing spring tension is responsive to an engine condition selected from the group consisting of: engine speed, exhaust gas pressure, engine temperature, exhaust gas recirculation activation, compression release braking activation, intake manifold pressure, fuel rate, throttle position, percent of engine load, ambient temperature, air fuel ratio, vehicle start up, and head rejection to coolant Btu/min.

19. The exhaust brake of claim 16 further comprising means for controlling the position of said second lever arm relative to a position of the first lever arm.

20. An exhaust brake comprising:

a main exhaust passage;

a main valve in said main exhaust passage for selectively blocking the flow of exhaust gas through the main exhaust passage;

means for selectively opening and closing the main valve;

a bypass exhaust passage communicating with said main exhaust passage at upstream and downstream locations relative to the main valve, said bypass providing for the flow of exhaust gas past the main valve;

a conical shaped stopper in said bypass exhaust passage for selectively closing the bypass exhaust passage;

a spring assisted means for biasing the stopper in a closed position;

a rod linking the stopper and the spring assisted biasing means;

a bushing providing a seal along the rod between the stopper and the spring assisted biasing means; and means for varying a biasing force provided by the biasing means responsive to exhaust gas pressure in the bypass exhaust passage.

21. The exhaust brake of claim 20 wherein said rod is sufficiently long to maintain said spring assisted means at a temperature sufficiently below that of the exhaust gas that it does not inhibit the mechanical properties of the selected spring material.

22. A method of operating an exhaust brake having a bypass system comprising the steps of:

providing an exhaust brake with a main valve and a conical shaped bypass valve for restricting the flow of exhaust gas;

selectively biasing the bypass valve into a closed position;

selectively closing the main valve;

increasing exhaust back pressure in the bypass system as a result of closing the main valve;

mechanically pulling the bypass valve open responsive to the level of exhaust back pressure in (1) the bypass system and (2) an upstream side of the main valve; and closing the bypass valve responsive to the level of exhaust back pressure in the bypass system.

23. The method of claim 22 wherein a force biasing said bypass valve is dependent upon an engine condition value selected from the group consisting of: engine speed, exhaust gas pressure, engine temperature, exhaust gas recirculation activation, compression release braking activation, exhaust manifold temperature, exhaust manifold pressure, exhaust gas temperature, foundation brake application, cylinder pressure, vehicle speed, exhaust brake actuation, intake manifold pressure, fuel rate, throttle position, percent of engine load, ambient temperature, air fuel ratio, vehicle start up, and head rejection to coolant Btu/min.

* * * * *